(12) United States Patent
Hayashi et al.

(10) Patent No.: US 10,921,587 B2
(45) Date of Patent: Feb. 16, 2021

(54) VEHICLE DISPLAY APPARATUS

(71) Applicant: KYOCERA Corporation, Kyoto (JP)

(72) Inventors: Yusuke Hayashi, Fort Lee, NJ (US);
Kaoru Kusafuka, Tokyo (JP); Satoshi Kawaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 167 days.

(21) Appl. No.: 16/095,641

(22) PCT Filed: Apr. 25, 2017

(86) PCT No.: PCT/JP2017/016428
§ 371 (c)(1),
(2) Date: Oct. 22, 2018

(87) PCT Pub. No.: WO2017/188276
PCT Pub. Date: Nov. 2, 2017

(65) Prior Publication Data
US 2019/0129167 A1 May 2, 2019

(30) Foreign Application Priority Data

Apr. 26, 2016 (JP) .............................. JP2016-087928
Apr. 26, 2016 (JP) .............................. JP2016-087932

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/30* (2013.01);
(Continued)

(58) Field of Classification Search
CPC ...... G02B 27/0101; G02B 27/01; G02B 5/30; G02B 27/286; G02B 2027/0118;
(Continued)

(56) References Cited

U.S. PATENT DOCUMENTS 7,791,807 B2   9/2010   Pasca et al.
7,839,574 B2  11/2010   Okada et al.
(Continued)

FOREIGN PATENT DOCUMENTS

JP   2010-113197 A   5/2010
JP   2012-103331 A   5/2012
(Continued)

*Primary Examiner* — Jonathan M Dager
*Assistant Examiner* — Jean W Charleston
(74) *Attorney, Agent, or Firm* — Studebaker & Brackett PC

(57) ABSTRACT

A vehicle display apparatus of the present disclosure includes a display and a reflective member. The reflective member reflects display light from the display. The display causes the display light to be incident on the reflective member as S polarized light. The reflective member is located along an incident light path of the display light from the display to a reflecting surface of a windshield of a vehicle or along a transmitted light path of transmitted light transmitted by the reflecting surface. The reflective member reflects linearly polarized incident light as circularly polarized reflected light. The vehicle display apparatus guides display light reflected at the reflective member and at the windshield to an eye box.

20 Claims, 5 Drawing Sheets

(51) Int. Cl.
*G02B 5/30* (2006.01)
*G02B 27/28* (2006.01)
*G02F 1/1335* (2006.01)
*B60R 11/00* (2006.01)

(52) U.S. Cl.
CPC ........... G02B 27/01 (2013.01); G02B 27/286 (2013.01); G02F 1/133528 (2013.01); *B60R 2011/0005* (2013.01)

(58) Field of Classification Search
CPC ....... G02B 2027/0196; G02F 1/133528; G02F 2001/133531; B60K 35/00; B60K 2370/1529; B60K 2370/23; B60K 2370/334; B60K 2370/349; B60R 2011/0005
USPC .......................................................... 701/36
See application file for complete search history.

(56) References Cited

U.S. PATENT DOCUMENTS

| | | |
|---|---|---|
| 9,454,039 B2 | 9/2016 | Matsushita et al. |
| 2004/0135742 A1 | 7/2004 | Weber et al. |
| 2005/0157398 A1* | 7/2005 | Nagaoka ............ G02B 27/0149 359/630 |
| 2010/0066645 A1* | 3/2010 | Ishii ................... G02B 27/0101 345/7 |
| 2012/0276374 A1* | 11/2012 | Hino ....................... B32B 17/10 428/339 |
| 2014/0032112 A1* | 1/2014 | Hansen ..................... B60R 1/12 701/533 |
| 2014/0184996 A1 | 7/2014 | Matsushita et al. |
| 2016/0178901 A1* | 6/2016 | Ishikawa ............ G02B 27/0006 345/7 |
| 2016/0349507 A1 | 12/2016 | Hayashi |
| 2017/0045738 A1* | 2/2017 | Kim ....................... B60K 35/00 |
| 2017/0096098 A1* | 4/2017 | Korthauer ................ B60R 1/00 |
| 2017/0184870 A1* | 6/2017 | Li ........................ G02B 27/286 |
| 2017/0199396 A1* | 7/2017 | Knoll .................... G02F 1/13318 |
| 2018/0203228 A1* | 7/2018 | Hatano .................. G02B 27/28 |

FOREIGN PATENT DOCUMENTS

| | | | |
|---|---|---|---|
| JP | 2012103331 A | * | 5/2012 |
| JP | 2013-057897 A | | 3/2013 |
| WO | 2016/047009 A1 | | 3/2016 |

\* cited by examiner

VEHICLE DISPLAY APPARATUS

CROSS-REFERENCE TO RELATED APPLICATION

The present application claims priority to and the benefit of Japanese Patent Application Nos. 2016-087928 and 2016-087932, filed Apr. 26, 2016, the entire contents of which are incorporated herein by reference.

TECHNICAL FIELD

The present disclosure relates to a vehicle display apparatus.

BACKGROUND

A vehicle display apparatus, such as a head-up display, reflects display light from a display onto the windshield or the like of a vehicle. The display is a liquid crystal display or the like. The operator of the vehicle perceives the reflected display light as a virtual image.

The vehicle display apparatus usually causes light emitted from the display to be incident on the windshield of the vehicle at an angle of approximately 65°. At this angle of incidence, the vehicle windshield typically has an extremely low reflectance of the P polarized light component and a relatively high reflectance of the S polarized light component. To make the virtual image more visible to the operator of the vehicle, a known vehicle display apparatus causes the display light from the display to be incident on the windshield as S polarized light, thereby ensuring high reflectance.

Polarized sunglasses are typically coated with a polarizing film that significantly reduces S polarized light. S polarized light reflected from the windshield is thus blocked by polarized sunglasses. Consequently, an operator wearing polarized sunglasses has difficulty seeing a virtual image.

A technique has been proposed to ensure visibility of the virtual image even when the operator of the vehicle is wearing polarized sunglasses. For example, the head-up display apparatus disclosed in patent literature (PTL) 1 converts S polarized display light from a liquid crystal panel to P polarized light using a selectively inserted half-wave plate. The vehicle head-up display apparatus disclosed in PTL 2 includes a second liquid crystal panel, as polarization conversion means, between a first liquid crystal panel and the windshield. The display light from the first liquid crystal panel is caused to be incident on the second liquid crystal panel as linearly polarized light at a 45° inclination relative to a plane including incident light and reflected light in the windshield (plane of incidence). The second liquid crystal panel is switched ON/OFF either to transmit the linearly polarized light that is at 45° relative to the plane of incidence or to rotate the incident linearly polarized light by 45° for conversion to S polarized light that is linearly polarized and is orthogonal to the plane of incidence. The polarized light is thus switched to be appropriate for when the operator is and is not wearing polarized sunglasses. The vehicle display apparatus disclosed in PTL 3 converts S polarized display light from a liquid crystal panel to P polarized light using a half-wave plate, or to circularly polarized light using a quarter-wave plate, and causes the converted light to be incident on the windshield.

CITATION LIST

Patent Literature

PTL 1: JP2010113197A
PTL 2: JP2012103331A
PTL 3: JP201357897A

SUMMARY

A vehicle display apparatus according to an embodiment of the present disclosure includes a display and a reflective member. The reflective member reflects display light from the display. The display causes the display light to be incident on the reflective member as S polarized light. The reflective member is located along an incident light path of the display light from the display to a reflecting surface of a windshield of a vehicle or along a transmitted light path of transmitted light transmitted by the reflecting surface. The reflective member reflects linearly polarized incident light as circularly polarized reflected light. The vehicle display apparatus guides display light reflected at the reflective member and at the windshield to an eye box.

DETAILED DESCRIPTION

Figure 1:
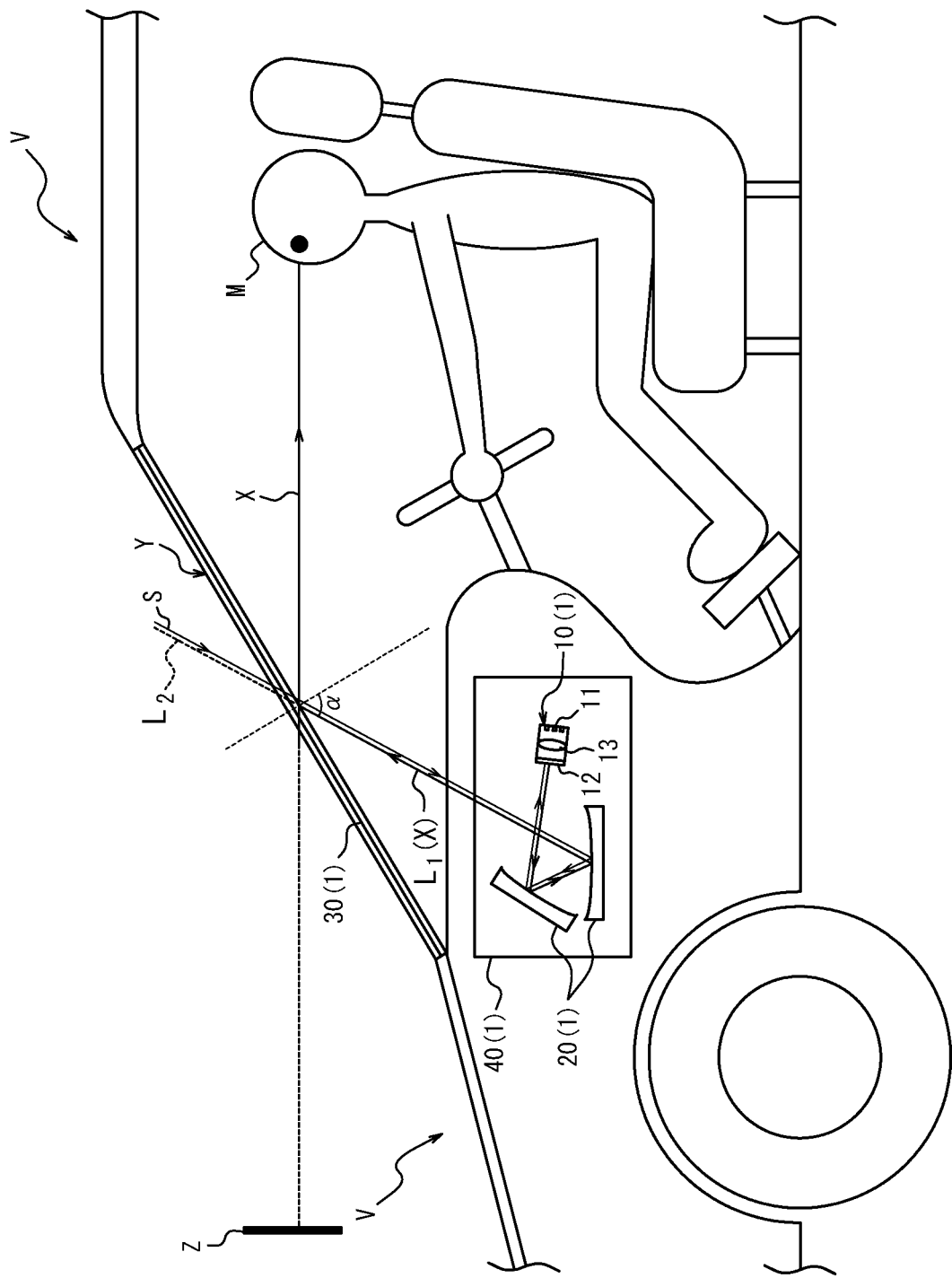
FIG. 1 is a side view illustrating the schematic configuration of a vehicle display apparatus according to a first embodiment of the present disclosure.

One of the embodiments of the present disclosure is described below in detail with reference to FIGS. 1 to 4.

The schematic configuration of a vehicle display apparatus 1 is described with reference to FIG. 1. The vehicle display apparatus 1 includes a display 10, a projection optical system 20, and a reflective member 30. The vehicle display apparatus 1 is used as a head-up display (HUD). The display 10 and the projection optical system 20 are stored in a housing 40. The housing 40 is housed in the dashboard or the like of a vehicle V. The display 10 and the projection optical system 20 are used as a head-up display module (HUD module).

The display 10 emits display light X through the projection optical system 20 to the outside of the housing 40. The display light X is reflected by the interface between a windshield Y of the vehicle V and an air layer (reflecting surface) and by the reflective member 30. The reflected display light X is guided to the eye box. The eye box is a predetermined space in which the eyes of an operator M, such as the driver of the vehicle V, are assumed to be located. The operator M sees a virtual image Z at a predetermined location in front of the windshield Y by receiving the display light X. The virtual image Z is an image that the operator M mistakenly perceives as being in front of the vehicle V. The incident light path of the display light X from the display 10 to the reflecting surface where the display light X is incident on the windshield Y is defined as $L_1$. The transmitted light path of display light transmitted by the reflecting surface is defined as $L_2$. Sunlight that is incident on the windshield Y along the transmitted light path $L_2$ from outside the vehicle, is transmitted by the windshield Y, and is incident on the display 10 along the incident light path $L_1$ is defined as S. This sunlight S is one type of backlight. The windshield Y is also referred to as a windscreen or front glass.

The display 10 is a device for displaying images. The display 10 includes a light source device 11, a display panel 12, and an illumination optical system 13 positioned between the light source device 11 and the display panel 12.

The light source device 11 is a member for emitting illumination light. For example, the light source device 11 includes one or more light emitting elements, such as light emitting diodes (LEDs), that irradiate and emit white light. The illumination optical system 13 includes a lens or a diffusing plate, for example. The illumination optical system 13 guides the illumination light emitted from the light source device 11 to the display panel 12.

The display panel 12 is a transmission-type display panel, for example. The display panel 12 includes a liquid crystal display panel or a MEMS shutter panel. A liquid crystal display panel may, for example, include a polarization filter, a glass substrate, electrodes, an alignment film, a liquid crystal display element, a color filter, and the like. When illumination light from the light source device 11 passes through the illumination optical system 13 and is irradiated on the display panel 12, the display panel 12 emits transmitted light as the display light X. The display light X becomes light corresponding to the image displayed by the display panel 12. When a color image is displayed on the display panel 12, the display light X becomes light corresponding to the color image. When the image displayed on the display panel 12 changes, the display light X changes in accordance with the change in the image. When the image displayed on the display panel 12 is updated, the display light X becomes light corresponding to the updated image. The display light X is linearly polarized light that has a polarization plane in a predetermined direction as a result of the polarization filter in the display panel 12.

The projection optical system 20 guides the display light X from the display 10 to the windshield Y. The projection optical system 20 can enlarge the range over which the display light X is projected. For example, the projection optical system 20 has a mirror such as a concave mirror. FIG. 1 illustrates an example of the projection optical system 20 having two mirrors, but the number of mirrors is not limited to two. The display light X emitted from the housing 40 by the projection optical system 20 is incident on the windshield Y at an angle of incidence α as S polarized light with a polarization direction orthogonal to the plane of incidence of the windshield Y (the plane including incident light and reflected light). The angle of incidence α is approximately 65° but is not limited to this value.

The windshield Y reflects a portion of incident light. The windshield Y may transmit a portion of incident light. The windshield Y may be provided in the vehicle V. The windshield Y is a component that reduces the effect of wind. The windshield Y may include a light-transmitting member such as glass, polycarbonate resin, or a methacrylic material. The transmittance of the windshield Y is, for example, 70% or more. The transmittance of the windshield Y is determined in accordance with the regulations of each country. The windshield Y may include a laminate formed by joining two or more light-transmitting members such as glass. The windshield Y may be a laminate of light-transmitting members of different materials. The windshield Y reflects a portion of the display light X irradiated from the housing 40.

The windshield Y reflects the display light X towards the space in which the eyes of the operator M can be assumed to be located.

Figure 2:
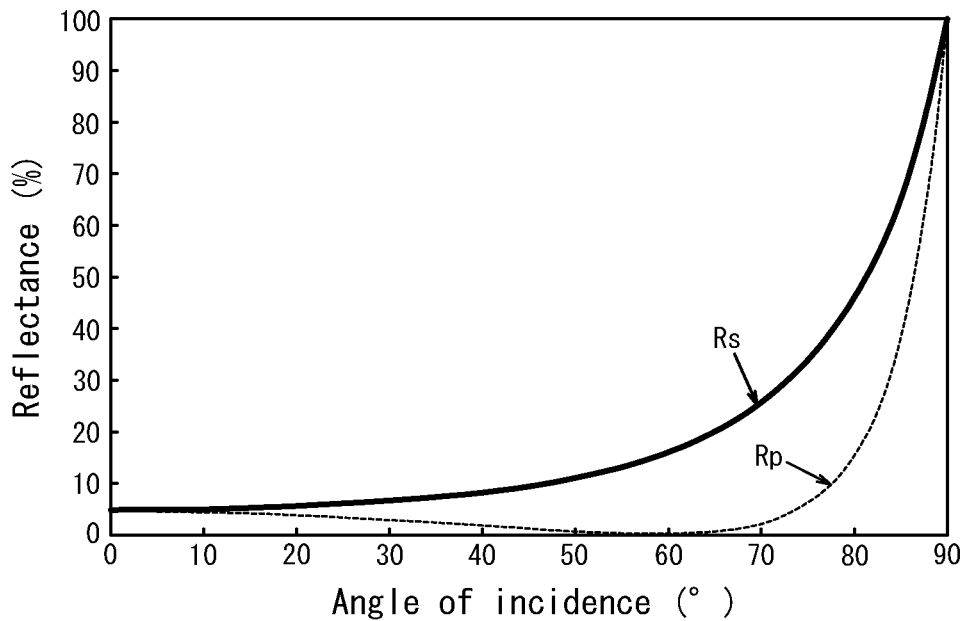
FIG. 2 illustrates how the reflectance of a windshield depends on the angle of incidence.

The way in which reflectance of the windshield Y depends on the angle of incidence is described with reference to FIG. 2. When the angle of incidence α of display light X on the windshield Y is approximately 65°, then the reflectance Rs with respect to S polarized light is approximately 20%, and the reflectance Rp with respect to P polarized light is approximately 1%. Consequently, the effective reflectance of the windshield Y increases by causing the display light X irradiated from the housing 40 to be incident on the windshield Y as S polarized light.

In FIG. 1, the virtual image Z is visible to the operator M as a result of the operator M receiving the display light X reflected by the windshield Y. Along with the display light X, the operator M receives ambient light from outside the vehicle through the windshield Y. The operator M perceives the virtual image Z in overlap with the outside scenery or the like that is visible through the windshield Y.

The reflective member 30 is positioned on the transmitted light path $L_2$ along which the display light X from the display 10 passes through the windshield Y. The reflective member 30 has the following optical properties on both sides thereof. Namely, the reflective member 30 reflects the display light X from the display 10 and sunlight S with substantially the same reflectance and transmits the display light X and the sunlight S with substantially the same transmittance.

The reflective member 30 reflects linearly polarized incident light as circularly polarized reflected light. The reflective member 30 transmits linearly polarized incident light as circularly polarized transmitted light. The reflective member 30 is a translucent member. The display light X from the display 10 is incident on the reflective member 30 as S polarized light. The reflective member 30 converts the incident display light X to circularly polarized light and reflects a portion thereof. The reflective member 30 reflects the display light X towards the space in which the eyes of the operator M can be assumed to be located. The operator M can therefore see the virtual image Z with the display light X reflected by the reflective member 30 in addition to the display light X reflected by the windshield Y.

The reflectance of the reflective member 30 may have higher peak values in the wavelength bands of visible light and infrared light than in other wavelength bands. Examples of such a reflective member 30 include the Zeon liquid crystal film produced by Zeon Corporation. The reflective member 30 reflects visible light and infrared light included in the sunlight S. The reflective member 30 reduces the incidence of visible light and infrared light included in the sunlight S on the display 10, thereby reducing a rise in temperature of the display 10 due to visible light and infrared light. The reflective member 30 reduces a deterioration in properties due to increased temperature of the display 10 or the like.

Figure 3:
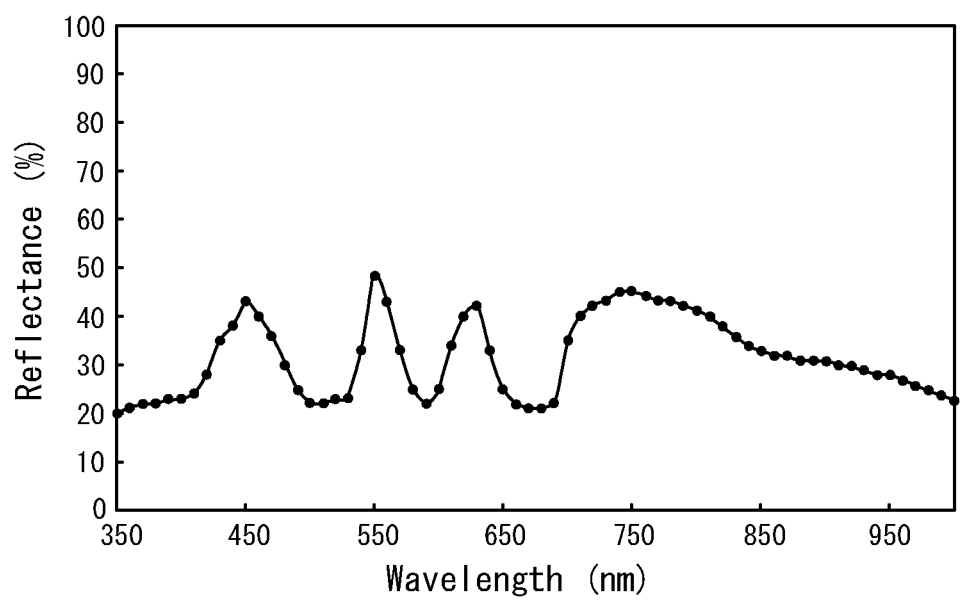
FIG. 3 illustrates an example of how the reflectance of a reflective member depends on the wavelength.

The reflective member 30 has predetermined peak values in the reflectance. For example, the peak values in the reflectance of the reflective member 30 may occur at visible light wavelengths of approximately 630 nanometers (nm), approximately 550 nm, and approximately 450 nm, and at an infrared wavelength of approximately 750 nm, as illustrated in FIG. 3. The three wavelengths of visible light correspond to the wavelengths of display light X emitted from red (R), green (G), and blue (B) color filters of the display panel 12. The reflectance peaks of the reflective member 30 correspond to the main wavelengths of light included in the display light X. The reflective member 30 produces little change in color when reflecting the display light X. Hence, little change occurs in the colors of the virtual image Z visible to the operator M.

The reflective member 30 is located inside the windshield Y in the present example. In greater detail, the reflective member 30 is located between light-transmitting members included in the windshield Y, as illustrated in FIG. 4.

Figure 4:
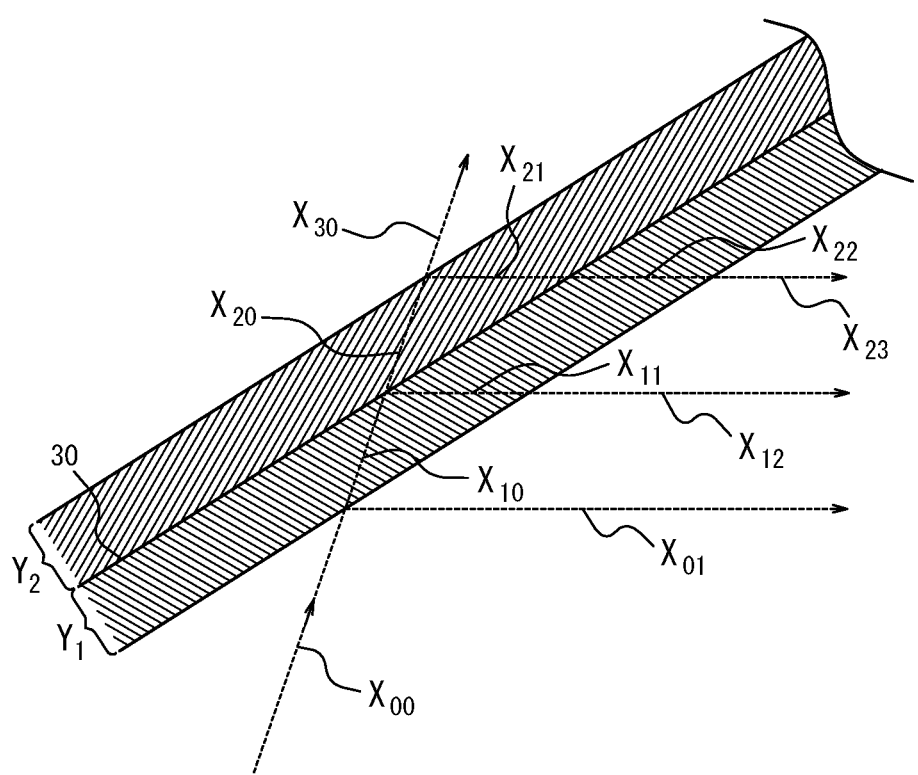
FIG. 4 is a cross-section illustrating reflection of display light on the reflective member and the windshield.

In the laminate included in the windshield Y, the layer of the light-transmitting member on which the display light X is incident first is designated the first layer $Y_1$, and the layer on which the display light X is incident second is designated the second layer $Y_2$, as illustrated in FIG. 4. The reflective member 30 is located between the first layer $Y_1$ and the second layer $Y_2$. The thickness of the reflective member 30 is small enough to be negligible compared to the thickness of the first layer $Y_1$ and the thickness of the second layer $Y_2$. The thickness of the windshield Y is, for example, approximately 5 millimeters (mm). The thickness of the reflective member 30 is, for example, approximately 16 micrometers (μm). The reflectance at the interface between the first layer $Y_1$ and the air layer and the reflectance at the interface between the second layer $Y_2$ and the air layer are both approximately 20% when the incident light is S polarized light and approximately 10% when the incident light is not S polarized light. The reflectance between the first layer $Y_1$ and the second layer $Y_2$ with the reflective member 30 therebetween is approximately 35%. For the sake of explanation in FIG. 4, incident light $X_{00}$, transmitted light $X_{10}$, transmitted light $X_{20}$, and transmitted light $X_{30}$ are indicated by straight lines.

The incident light $X_{00}$ that is S polarized light (display light X) is incident on the first layer $Y_1$ at an angle of incidence of approximately 65°, a portion is reflected as reflected light $X_{01}$ that is S polarized light, and the remainder is refracted and transmitted as transmitted light $X_{10}$ that is S polarized light. Since the reflectance of the windshield Y with respect to the S polarized incident light $X_{00}$ is approximately 20%, as described above, the brightness of the reflected light $X_{01}$ is approximately 20% of the brightness of the incident light $X_{00}$, and the brightness of the transmitted light $X_{10}$ is approximately 80% of the brightness of the incident light $X_{00}$.

As described above, the reflective member 30 has the property of reflecting linearly polarized incident light as circularly polarized reflected light and of transmitting linearly polarized incident light as circularly polarized transmitted light. When S polarized transmitted light $X_{10}$ is incident on the reflective member 30, a portion is therefore reflected as circularly polarized reflected light $X_{11}$, and the remainder is refracted and transmitted as circularly polarized transmitted light $X_{20}$. The thickness of the reflective member 30 is small enough for the light reflected when the transmitted light $X_{10}$ is incident on the reflective member 30 from the first layer $Y_1$ and the light reflected when the transmitted light $X_{10}$ is transmitted by the reflective member 30 and is incident on the second layer $Y_2$ to be considered identical. The light reflected when the transmitted light $X_{10}$ is incident on the reflective member 30 from the first layer $Y_1$ and the light reflected when the transmitted light $X_{10}$ is transmitted by the reflective member 30 and is incident on the second layer $Y_2$ are collectively designated as the reflected light $X_{11}$. The reflectance between the first layer $Y_1$ and the second layer $Y_2$ with the reflective member 30 therebetween is approximately 35%, as described above. The brightness of the reflected light $X_{11}$ is therefore approximately 35% of the brightness of the transmitted light $X_{10}$. The brightness of the transmitted light $X_{20}$ is approximately 65% of the brightness of the transmitted light $X_{10}$.

When the circularly polarized reflected light $X_{11}$ is incident on the air layer from the first layer $Y_1$ at a smaller angle of incidence than the critical angle, a portion of the S polarized light component is reflected, and the remainder is transmitted as circularly polarized reflected light $X_{12}$. The reflectance at the interface between the first layer $Y_1$ and the air layer is approximately 10% when the incident light is not S polarized light, as described above. Among the circularly polarized reflected light $X_{11}$, the reflected light $X_{12}$ transmitted by the first layer $Y_1$ therefore has a brightness of approximately 90% of the brightness of the reflected light $X_{11}$.

When the circularly polarized transmitted light $X_{20}$ is incident on the air layer from the second layer $Y_2$ at a smaller angle of incidence than the critical angle, a portion of the S polarized light component is reflected as reflected light $X_{21}$, and the remainder is transmitted as circularly polarized transmitted light $X_{30}$. The reflectance at the interface between the second layer $Y_2$ and the air layer is approximately 10% when the incident light is not S polarized light, as described above. Among the circularly polarized transmitted light $X_{20}$, the reflected light $X_{21}$ that is reflected at the second layer $Y_2$ therefore has a brightness of approximately 10% of the brightness of the transmitted light $X_{20}$, and the transmitted light $X_{30}$ that is transmitted by the second layer $Y_2$ has a brightness of approximately 90% of the brightness of the transmitted light $X_{20}$.

The S polarized reflected light $X_{21}$ is incident on the reflective member 30 from the second layer $Y_2$, a portion is reflected, and the remainder is transmitted as circularly polarized reflected light $X_{22}$. The reflectance between the first layer $Y_1$ and the second layer $Y_2$ with the reflective member 30 therebetween is approximately 35%. The brightness of the reflected light $X_{22}$ transmitted by the reflective member 30 is therefore approximately 65% of the brightness of the reflected light $X_{21}$.

When the circularly polarized reflected light $X_{22}$ is incident on the air layer from the first layer $Y_1$ at a smaller angle of incidence than the critical angle, a portion of the S polarized light component is reflected, and the remainder is transmitted as circularly polarized reflected light $X_{23}$. The reflectance at the interface between the first layer $Y_1$ and the air layer is approximately 10% when the incident light is not S polarized light, as described above. Among the circularly polarized reflected light $X_{22}$, the reflected light $X_{23}$ transmitted by the first layer $Y_1$ therefore has a brightness of approximately 90% of the brightness of the reflected light $X_{22}$.

When the incident light $X_{00}$ is incident at an angle of incidence of approximately 65°, the combination of the reflective member 30 and the windshield Y thus reflects the reflected light $X_{01}$, $X_{12}$, and $X_{23}$ as display light X.

Table 1 summarizes information on the above-described incident light $X_{00}$, reflected light $X_{01}$, transmitted light $X_{10}$, reflected light $X_{11}$, reflected light $X_{12}$, transmitted light $X_{20}$, reflected light $X_{21}$, reflected light $X_{22}$, reflected light $X_{23}$, and transmitted light $X_{30}$. In Table 1, the brightness is a relative value with the brightness of the incident light $X_{00}$ defined as 100. In Table 1, the transmittance, reflectance, transmitted brightness, and reflected brightness are the values when each beam of light is transmitted or reflected at the interface in the direction of travel.

TABLE 1

| Light | $X_{00}$ | $X_{01}$ | $X_{10}$ | $X_{11}$ | $X_{12}$ | $X_{20}$ | $X_{21}$ | $X_{22}$ | $X_{23}$ | $X_{30}$ |
|---|---|---|---|---|---|---|---|---|---|---|
| Brightness | 100 | 20 | 80 | 28 | 25.2 | 52 | 5.2 | 3.38 | 3.042 | 46.8 |
| Transmittance (%) | 80 | — | 65 | 90 | — | 90 | 65 | 90 | — | — |
| Reflectance (%) | 20 | — | 35 | 10 | — | 10 | 35 | 10 | — | — |
| Transmitted brightness | 80 | — | 52 | 25.2 | — | 46.8 | 3.38 | 3.042 | — | — |
| Reflected brightness | 20 | | 28 | 2.8 | | 5.2 | 1.82 | 0.338 | | |
| Polarization state | S | S | S | circular | circular | circular | S | circular | circular | circular |

As illustrated in Table 1, when S polarized incident light $X_{00}$ with a brightness of 100 is incident on the reflective member 30 and the windshield Y, then S polarized reflected light $X_{01}$ with a brightness of 20, circularly polarized reflected light $X_{12}$ with a brightness of 25.2, and circularly polarized reflected light $X_{23}$ with a brightness of 3.042 are reflected as display light X.

Use of the reflected light $X_{01}$ and reflected light $X_{23}$ as the display light X could possibly lead to a double image. However, the brightness of the reflected light $X_{23}$, i.e. 3.042, is only 6.7% of the combined brightness of the reflected light $X_{01}$ and reflected light $X_{12}$, i.e. 45.2, and is therefore small enough to inhibit visibility of a double image. The gap between the reflected light $X_{01}$ and the reflected light $X_{12}$ is sufficiently narrow to yield a small difference in optical path length, so that a double image tends not to be visible.

In the vehicle display apparatus 1, the reflective member 30 is a member that reflects linearly polarized incident light as circularly polarized reflected light. Display light X from the display 10 is caused to be incident on the reflective member 30 as S polarized light. In addition to the S polarized light reflected by the windshield Y (reflected light $X_{01}$), the circularly polarized reflected light $X_{12}$ that is reflected by the reflective member 30 and transmitted by the windshield Y is used as the display light X. Even if the operator M of the vehicle V is wearing polarized sunglasses that block the S polarized light component, the operator M can be caused to perceive the virtual image Z, because the circularly polarized reflected light $X_{12}$ is transmitted by the polarized sunglasses. When the operator M of the vehicle V is not wearing polarized sunglasses, the operator M can be caused to perceive the virtual image Z by the S polarized light reflected by the windshield Y and/or the circularly polarized reflected light $X_{12}$. The vehicle display apparatus 1 according to the present embodiment therefore allows the operator M of the vehicle V to perceive the virtual image Z regardless of whether the operator M is wearing polarized sunglasses.

The reflective member 30 is located in the windshield Y in the vehicle display apparatus 1. The difference in light beams between the display light X reflected by the reflective member 30 and the display light X reflected by the windshield Y is therefore small. The vehicle display apparatus 1 can cause the operator M of the vehicle V to perceive a virtual image Z from two beams of display light X at substantially the same location. The spatial movement of the virtual image Z stemming from whether or not the operator M of the vehicle V is wearing polarized sunglasses is small with the vehicle display apparatus 1.

Furthermore, the reflective member 30 in the vehicle display apparatus 1 according to the present embodiment is located between light-transmitting members included in the windshield Y. The gap between the display light reflected by the reflective member 30 and the display light reflected by the windshield Y is sufficiently narrow to yield a small difference in optical path length, so that a double image tends not to be visible.

Second Embodiment

One of the embodiments of the present disclosure is described below in detail with reference to FIGS. 5 and 6.

Figure 5:
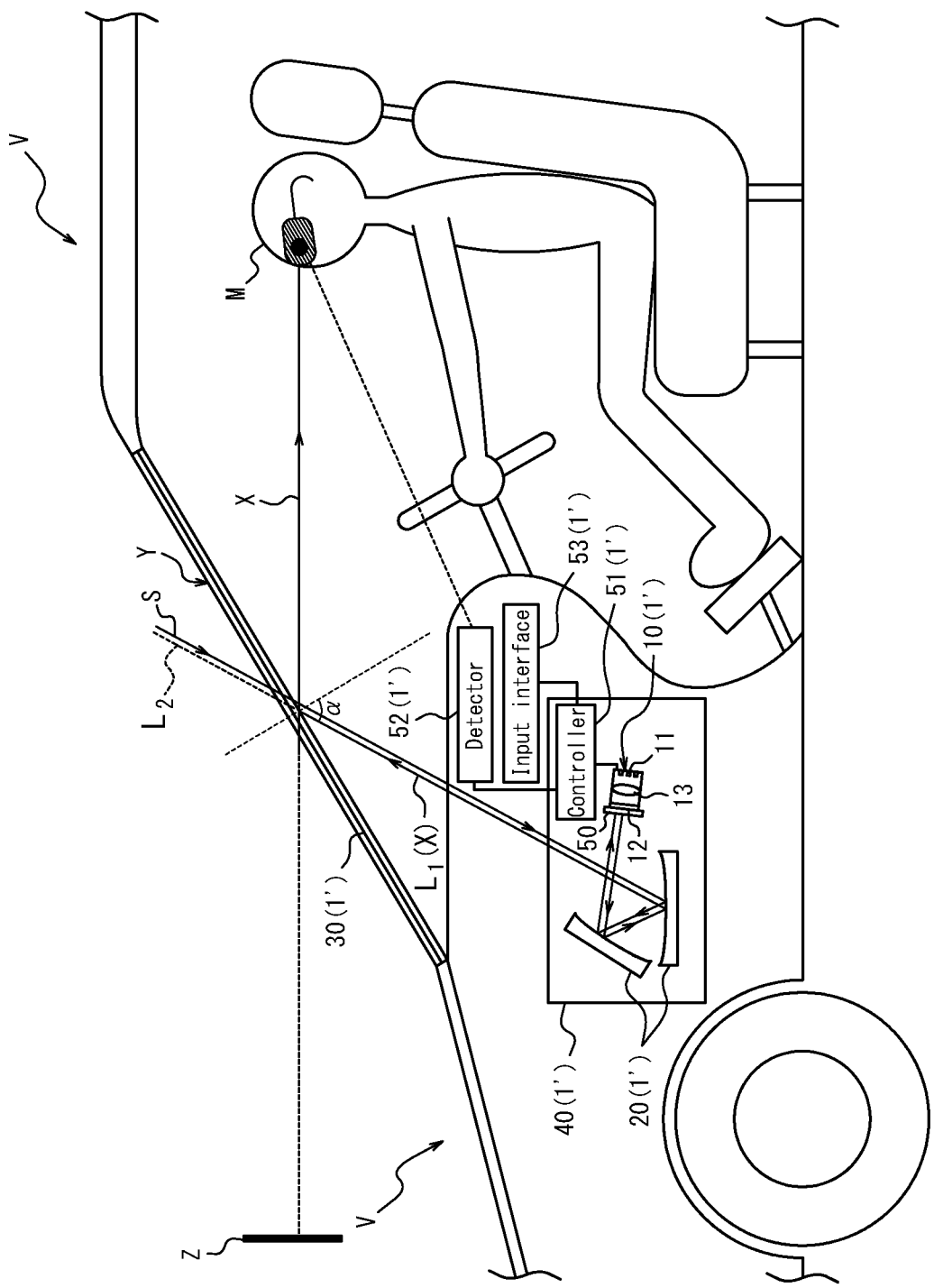
FIG. 5 is a side view illustrating the schematic configuration of a vehicle display apparatus according to a second embodiment of the present disclosure.

As illustrated in FIG. 5, a vehicle display apparatus 1' includes a display 10, a projection optical system 20, a reflective member 30, a reflective polarizer 50, a controller 51, a detector 52, and an input interface 53. The vehicle display apparatus 1' is used as a head-up display. The display 10, the projection optical system 20, and the controller 51 are stored in a housing 40. The housing 40 is housed inside the dashboard or the like of a vehicle V. The detector 52 and the input interface 53 are connected to the controller 51 over a wired or wireless connection to communicate information. The constituent elements of the vehicle display apparatus 1' other than the reflective polarizer 50, controller 51, detector 52, and input interface 53 are similar to those of the vehicle display apparatus 1 according to the first embodiment. Hence, a description thereof is omitted.

The reflective polarizer 50 is located along the incident light path $L_1$ of the display light X from the display 10 to the windshield Y. The reflective polarizer 50 is located between the display 10 and the reflective member 30. The reflective polarizer 50 is a polarizer that reflects polarized light components other than a particular linearly polarized light component. The reflective polarizer 50 reflects polarized light components other than a polarized light component that is identical to the display light X from the display 10. In the present example, the reflective polarizer 50 is adjacent to the display 10. Placement of the reflective polarizer 50 adjacent to the display 10 allows a reduction in the size of the reflective polarizer 50.

On the basis of the result of detection by the detector 52 or input information from the input interface 53, the controller 51 adjusts the brightness of illumination light emitted from the light source device 11. The brightness of the display light X from the display 10 is adjusted by adjustment of the brightness of the illumination light. The controller 51 includes a microcomputer, for example. The controller 51 need not be stored in the housing 40.

The detector 52 detects whether the operator M of the vehicle V is wearing sunglasses. The detector 52 includes an imaging apparatus, such as a driver monitor camera. The detector 52 acquires operator information by processing such as photographing the operator M of the vehicle V and extracts feature information from the operator information by processing the photographed image with image signal processing or the like. When the detector 52 detects information on whether the operator M of the vehicle V is wearing sunglasses, the detector 52 outputs the detection result to the controller 51.

The input interface 53 receives input of information indicating that the operator M is wearing polarized sunglasses (information indicating wearing of polarized sunglasses) and is not wearing polarized sunglasses (information indicating non-wearing of polarized sunglasses). The input interface 53 receives the input information in response to operation by the operator M of the vehicle V. The input interface 53 is located at a position facilitating operation by the operator M of the vehicle V, such as the steering wheel. The input interface 53 may, for example, include a switch for switching between the information indicating wearing of polarized sunglasses and the information indicating non-wearing of polarized sunglasses. The input interface 53 outputs the input information to the controller 51 upon input of the information indicating wearing of polarized sunglasses or the information indicating non-wearing of polarized sunglasses.

Figure 6:
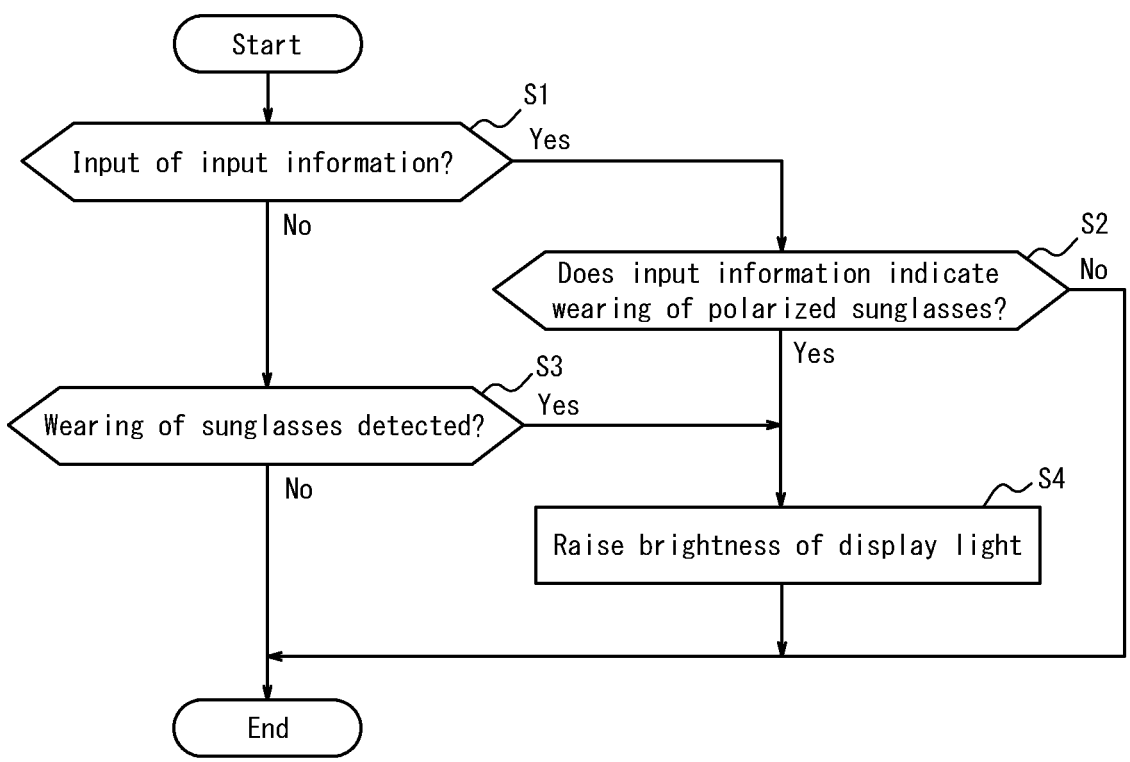
FIG. 6 is a flowchart illustrating control by the vehicle display apparatus in FIG. 5.

As illustrated in FIG. 6, the controller 51 judges whether input information has been input from the input interface 53 (step S1). When it is judged that input information has been input in step S1 (step S1: Yes), the controller 51 judges whether the input information is information indicating wearing of polarized sunglasses (step S2). Conversely, when it is judged that input information has not been input in step S1 (step S1: No), the controller 51 judges whether the detection result input from the detector 52 indicates wearing of sunglasses (step S3).

When it is judged in step S2 that the input information is information indicating wearing of polarized sunglasses (step S2: Yes), the controller 51 performs control to raise the brightness of the display light X from the display 10 (step S4) and terminates the processing. Conversely, when it is judged in step S2 that the input information is information indicating non-wearing of polarized sunglasses (step S2: No), the controller 51 terminates the processing without adjusting the brightness of the display light X from the display 10.

When it is judged in step S3 that the detection result indicates wearing of sunglasses (step S3: Yes), the controller 51 performs control to raise the brightness of the display light X from the display 10 (step S4) and terminates the processing. Conversely, when it is judged in step S3 that the detection result does not indicate wearing of sunglasses (step S3: No), the controller 51 terminates the processing without adjusting the brightness of the display light X from the display 10.

In addition to effects similar to those of the vehicle display apparatus 1, the vehicle display apparatus 1' can also obtain the following effects. The vehicle display apparatus 1' further includes the controller 51 and the detector 52 that detects wearing of sunglasses by the operator M of the vehicle V. When the detector 52 detects wearing of sunglasses by the operator M, the controller 51 performs control to raise the brightness of the display light X from the display 10. The vehicle display apparatus 1' emits brighter display light X when the operator M of the vehicle V is wearing sunglasses than when the operator M is not wearing sunglasses. The operator M can therefore see the virtual image Z despite the brightness of the display light X incident on the operator M's eyeball being reduced by sunglasses.

In addition to the configuration of the vehicle display apparatus 1, the vehicle display apparatus 1' includes the input interface 53 that receives input of information indicating wearing of polarized sunglasses in response to operation by the operator M. When information indicating wearing of polarized sunglasses is input to the input interface 53, the controller 51 performs control to raise the brightness of the display light X from the display 10 regardless of the detection result from the detector 52. Even when the detector 52 detects non-polarized sunglasses or is unable to detect polarized sunglasses, the vehicle display apparatus 1' can adjust the brightness of the display light X on the basis of information, input by the operator M himself, indicating wearing of polarized sunglasses.

In addition to the configuration of the vehicle display apparatus 1, the vehicle display apparatus 1' further includes the reflective polarizer 50 between the display 10 and the reflective member 30 along the incident light path $L_1$ of the display light X from the display 10 to the windshield Y. The reflective polarizer 50 reflects polarized light components other than a polarized light component that is identical to the display light X from the display 10. The display light X from the display 10 is transmitted by the reflective polarizer 50 without being blocked, whereas a polarized component included in the sunlight S and differing from the display light X is reflected by the reflective polarizer 50. The vehicle display apparatus 1' can further reduce the amount of sunlight S incident on the display 10 while guaranteeing visibility of the virtual image Z made visible to the operator M of the vehicle V.

Although the present disclosure is based on drawings and embodiments, it is to be noted that various changes and modifications will be apparent to those skilled in the art on the basis of the present disclosure. Therefore, such changes and modifications are to be understood as included within the scope of the present disclosure. For example, the functions and the like included in the various components and steps may be reordered in any logically consistent way. Components, steps, or the like may also be combined into one or divided.

The reflective member 30 in the vehicle display apparatuses 1 and 1' has been described as being located between light-transmitting members included in the windshield Y, but the reflective member 30 is not limited to this configuration. The reflective member 30 may be located at any position along the incident light path $L_1$ or the transmitted light path $L_2$.

In the vehicle display apparatuses 1 and 1', the reflective member 30 has been described as having the property of reflecting linearly polarized incident light as circularly polarized reflected light and of transmitting linearly polarized incident light as circularly polarized transmitted light, but the reflective member 30 is not limited to this configuration. The reflective member 30 may have the property of reflecting linearly polarized incident light as circularly polarized reflected light and of transmitting linearly polarized incident light as transmitted light that is not circularly polarized.

The detector 52 in the vehicle display apparatus 1' has been described as detecting information on whether the operator M of the vehicle V is wearing sunglasses and then outputting the detection result to the controller 51, but the detector 52 is not limited to this configuration. The detector 52 may output the acquired operator information to the controller 51, and the controller 51 may detect, from the received operator information, information on whether the operator M of the vehicle V is wearing sunglasses.

In addition to the configuration of the vehicle display apparatus 1, the vehicle display apparatus 1' has been described as including the controller 51, the detector 52, and the input interface 53, but the vehicle display apparatus 1' is not limited to this configuration. The vehicle display apparatus 1' may include only the controller 51 and the detector 52 in addition to the configuration of the vehicle display apparatus 1. In this case, instead of performing the control in the flowchart of FIG. 6, the controller 51 performs control to raise the brightness of the display light X from the display 10 when judging that the detection result input from the detector 52 indicates wearing of sunglasses and terminates the processing without adjusting the brightness of the display light X from the display 10 when judging that the detection result does not indicate wearing of sunglasses. The vehicle display apparatus 1' may include only the controller 51 and the input interface 53 in addition to the configuration of the vehicle display apparatus 1. In this case, instead of performing the control in the flowchart of FIG. 6, the controller 51 performs control to raise the brightness of the display light X from the display 10 upon receiving input from the input interface 53 of information indicating wearing of polarized sunglasses.

The reflective polarizer 50 has been described as being adjacent to the display 10 in the vehicle display apparatus 1', but the reflective polarizer 50 is not limited to this configuration. The reflective polarizer 50 may be located at any position along the incident light path $L_1$ or the transmitted light path $L_2$ between the display 10 and the reflective member 30.

A vehicle display apparatus has been described in the above embodiments, but the above structures may be applied to display apparatuses used for purposes other than vehicles. Examples of such display apparatuses include a game device display apparatus that allows a player to see a game screen as a virtual image and a display apparatus for assisting performers, such as a prompter that allows a performer to see a script or other such information as a virtual image.

REFERENCE SIGNS LIST 1, 1' Vehicle display apparatus
10 Display
11 Light source device
12 Display panel
13 Illumination optical system
20 Projection optical system
30 Reflective member
40 Housing
50 Reflective polarizer
51 Controller
52 Detector
53 Input interface
$L_1$ Incident light path to windshield
$L_2$ Transmitted light path from windshield
M Operator
V Vehicle
X Display light
Y Windshield
Z Virtual image

The invention claimed is:

1. A vehicle display apparatus comprising:
a display; and
a reflective member configured to reflect display light from the display; wherein
the display causes the display light to be incident on the reflective member as S polarized light;
the reflective member
is located along an incident light path of the display light from the display to a reflecting surface of a windshield of a vehicle or along a transmitted light path of transmitted light transmitted by the reflecting surface, and
converts linearly polarized incident light to circularly polarized reflected light; and
the vehicle display apparatus guides display light reflected at the reflective member and at the windshield to an eye box.

2. The vehicle display apparatus of claim 1, wherein the reflective member is included in the windshield.

3. The vehicle display apparatus of claim 2, wherein
the windshield comprises a laminate comprising two or more light-transmitting members; and
the reflective member is located between the light-transmitting members.

4. The vehicle display apparatus of claim 1, further comprising:
a controller; and
a detector configured to detect wearing of sunglasses by an operator of the vehicle; wherein
the controller is configured to perform control to raise a brightness of the display light from the display when the detector detects wearing of sunglasses by the operator.

5. The vehicle display apparatus of claim 4, further comprising:
an input interface configured to receive input of information indicating wearing of polarized sunglasses in response to operation by the operator; wherein
the controller is configured to perform control to raise a brightness of the display light from the display, regardless of a detection result from the detector, when the information indicating wearing of polarized sunglasses is input to the input interface.

6. The vehicle display apparatus of claim 1, further comprising:
a controller; and
an input interface configured to receive input of information indicating wearing of polarized sunglasses in response to operation by an operator of the vehicle; wherein
the controller is configured to perform control to raise a brightness of the display light from the display when the information indicating wearing of polarized sunglasses is input to the input interface.

7. The vehicle display apparatus of claim 1, wherein a reflectance of the reflective member has a higher peak in a wavelength band of visible light than in another wavelength band.

8. The vehicle display apparatus of claim 1, further comprising a reflective polarizer that is located along the incident light path or the transmitted light path between the display and the reflective member and is configured to reflect a polarized light component other than a polarized light component identical to the display light from the display.

9. The vehicle display apparatus of claim 2, further comprising:
a controller; and
a detector configured to detect wearing of sunglasses by an operator of the vehicle; wherein
the controller is configured to perform control to raise a brightness of the display light from the display when the detector detects wearing of sunglasses by the operator.

10. The vehicle display apparatus of claim 3, further comprising:
a controller; and
a detector configured to detect wearing of sunglasses by an operator of the vehicle; wherein the controller is configured to perform control to raise a brightness of the display light from the display when the detector detects wearing of sunglasses by the operator.

11. The vehicle display apparatus of claim 9, further comprising:
an input interface configured to receive input of information indicating wearing of polarized sunglasses in response to operation by the operator; wherein
the controller is configured to perform control to raise a brightness of the display light from the display, regardless of a detection result from the detector, when the information indicating wearing of polarized sunglasses is input to the input interface.

12. The vehicle display apparatus of claim 10, further comprising:
an input interface configured to receive input of information indicating wearing of polarized sunglasses in response to operation by the operator; wherein
the controller is configured to perform control to raise a brightness of the display light from the display, regardless of a detection result from the detector, when the information indicating wearing of polarized sunglasses is input to the input interface.

13. The vehicle display apparatus of claim 2, further comprising:
a controller; and
an input interface configured to receive input of information indicating wearing of polarized sunglasses in response to operation by an operator of the vehicle; wherein
the controller is configured to perform control to raise a brightness of the display light from the display when the information indicating wearing of polarized sunglasses is input to the input interface.

14. The vehicle display apparatus of claim 3, further comprising:
a controller; and
an input interface configured to receive input of information indicating wearing of polarized sunglasses in response to operation by an operator of the vehicle; wherein
the controller is configured to perform control to raise a brightness of the display light from the display when the information indicating wearing of polarized sunglasses is input to the input interface.

15. The vehicle display apparatus of claim 2, wherein a reflectance of the reflective member has a higher peak in a wavelength band of visible light than in another wavelength band.

16. The vehicle display apparatus of claim 3, wherein a reflectance of the reflective member has a higher peak in a wavelength band of visible light than in another wavelength band.

17. The vehicle display apparatus of claim 4, wherein a reflectance of the reflective member has a higher peak in a wavelength band of visible light than in another wavelength band.

18. The vehicle display apparatus of claim 5, wherein a reflectance of the reflective member has a higher peak in a wavelength band of visible light than in another wavelength band.

19. The vehicle display apparatus of claim 6, wherein a reflectance of the reflective member has a higher peak in a wavelength band of visible light than in another wavelength band.

20. The vehicle display apparatus of claim 9, wherein a reflectance of the reflective member has a higher peak in a wavelength band of visible light than in another wavelength band.

* * * * *